United States Patent [19]
Ericsson et al.

[11] Patent Number: 5,657,348
[45] Date of Patent: Aug. 12, 1997

[54] METHOD FOR FORMING A QUALITY MEASURE FOR SIGNAL BURSTS

[75] Inventors: Leif Linus Ericsson, Täby; Andras Antal Toth, Järfälla; Johan Sköld, Åkersberga, all of Sweden

[73] Assignee: Telefonaktiebolaget LM Ericsson, Stockholm, Sweden

[21] Appl. No.: 581,753

[22] Filed: Jan. 2, 1996

Related U.S. Application Data

[63] Continuation of Ser. No. 108,450, Aug. 19, 1993, abandoned.

[30] Foreign Application Priority Data

Aug. 21, 1992 [SE] Sweden ................................ 9202406

[51] Int. Cl.$^6$ .................................................... H04B 17/00
[52] U.S. Cl. ............................................ 375/227; 375/224
[58] Field of Search ..................................... 375/224, 346, 375/227, 348; 455/135; 370/13

[56] References Cited

FOREIGN PATENT DOCUMENTS

| 86935 | 7/1992 | Finland. |
| WO92/17005 | 10/1992 | WIPO. |

*Primary Examiner*—Stephen Chin
*Assistant Examiner*—T. Ghebretinsae
*Attorney, Agent, or Firm*—Burns, Doane, Swecker & Mathis, L.L.P.

[57] ABSTRACT

A method in connection with digital mobile radio communication systems for forming, in a receiver, a quality measure SQ of the signal vector received in a signal burst comprises forming a first estimate $E_s$ of the energy of the useful signal of the signal vector, forming a second estimate $E_n$ of the energy of the remaining signal components of the signal vector, and forming the quality measure SQ of the signal vector in accordance with the formula $SQ = K_1 E_s/(K_2 + E_n)$, where $K_1$ and $K_2$ are predetermined constants.

9 Claims, 1 Drawing Sheet

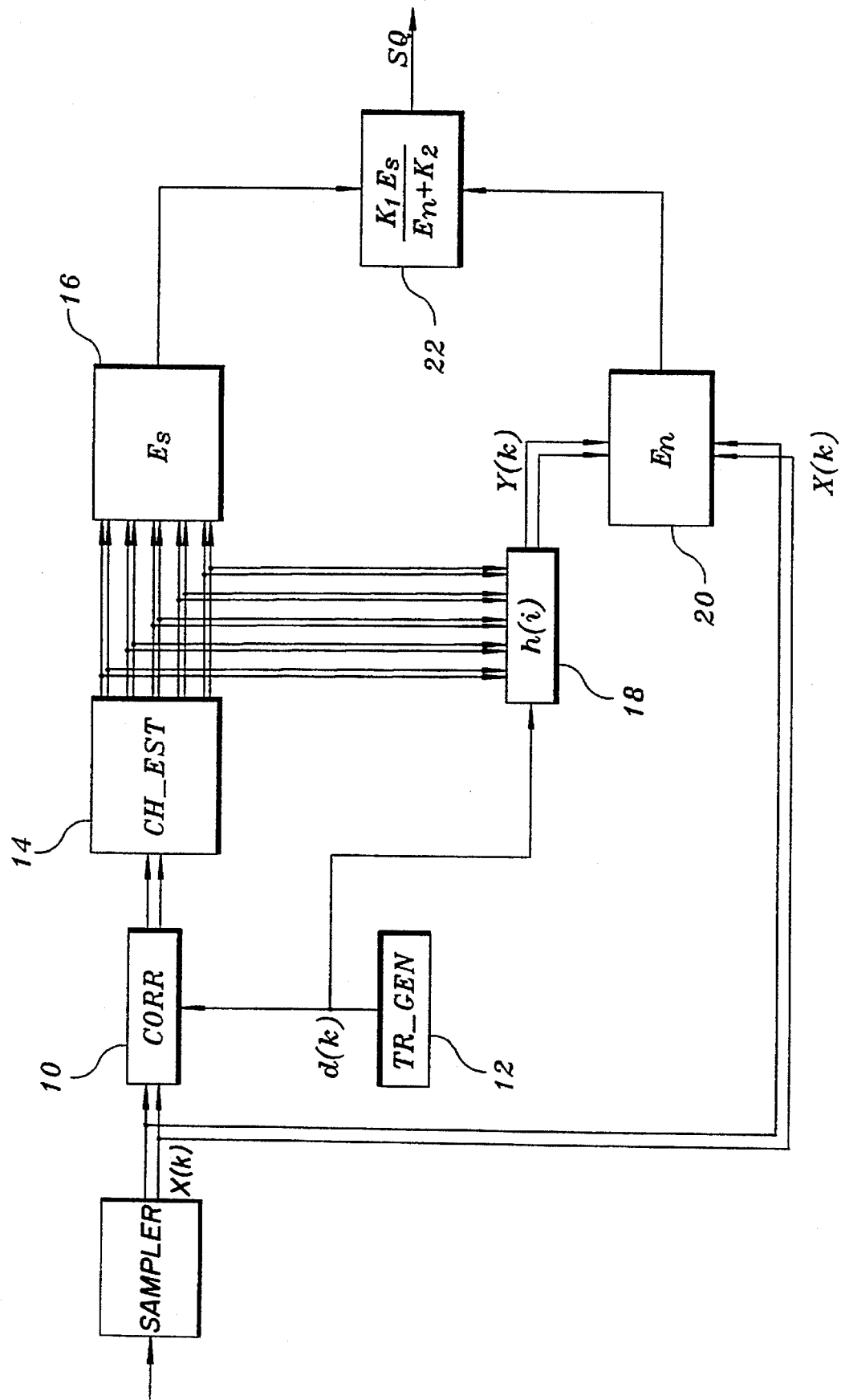

METHOD FOR FORMING A QUALITY MEASURE FOR SIGNAL BURSTS

This application is a continuation of application Ser. No. 08/108,450, filed Aug. 19, 1993, abandoned.

TECHNICAL FIELD

The present invention relates to a method for digital mobile radio communication systems for forming a quality measure SQ for the signal vector of a signal burst received by a receiver.

BACKGROUND OF THE INVENTION

In digital mobile radio communication systems different types of quality measures of the signal received by a receiver are used for and for instance validation of this signal. The validity of so called access bursts is for example tested in a base station. Such bursts are transmitted by a mobile station in connection with an access. In this situation it is important to be able to decide if the received signal burst really is an access burst or if it is a disturbance that looks like an access burst.

However, available quality measures have proven to be insufficiently stable, and certain special types of disturbances can be misinterpreted by the base station and be interpreted as proper access bursts and thereby block the entire base station.

SUMMARY OF THE INVENTION

An object of the present invention is therefore to provide a method for determining a stable quality measure SQ of the signal/noise ratio of the received signal.

In accordance with the present invention this object is solved by a method of the type mentioned in the preamble, which method is characterized by
(a) forming a first estimate $E_s$ of the energy of the useful signal for said signal vector,
(b) forming a second estimate $E_n$ of the energy of the remaining signal components in said signal vector, and
(c) forming a quality measure SQ of the signal vector in accordance with the formula:

$$SQ = \frac{K_1 E_s}{K_2 + E_n}$$

where $K_1$ and $K_2$ are predetermined constants.

This measure SQ has proven to be well correlated with the raw bit error rate after the equalizer in the receiver and is to a high extent independent of the type of disturbance.

BRIEF DESCRIPTION OF THE DRAWING

The invention, together with further objects and advantages thereof, may best be understood by making reference to the following description taken together with the accompanying drawing, which shows a block diagram for calculating a quality measure SQ in accordance with the present invention.

DETAILED DESCRIPTION OF THE PREFERRED EMBODIMENTS

FIG. 1 shows a block diagram for calculating the quality measure SQ in accordance with the present invention. The complex (in the drawing complex signals are represented by double lines) signal components X(k) received by the receiver are forwarded to a correlator 10, in which they are correlated with the signal components in a training sequence d(k) in a manner known per se. This sequence is generated by a training sequence generator 12. In for instance the GSM standard this training sequence has a length of 41 bits for access bursts and 26 bits for normal bursts. The same sequence is also transmitted by the transmitter, and in the GSM standard it is positioned in the beginning of an access burst and in the middle of a normal signal burst. In a channel estimator 14 a channel estimate is formed with the aid of the correlation values from the correlator. This estimate can for instance comprise 5 correlation values h(i) around that part of the correlation sequence generated by generator 10 where the energy is concentrated. Different methods for determining these five correlation values are previously known; a suitable method is described in for example Swedish Patent Application 92 00079-3. More than less than five components h(i) may be used to form the channel estimate.

The channel estimate from channel estimator 14 is forwarded to an energy calculator 16, in which a measure of the energy of the channel estimate is calculated, for instance in accordance with the formula:

$$E_s = \sum_{i=0}^{4} |h(i)|^2$$

The correlation components h(i) from the channel estimate are also used as filter coefficients in a filter 18, in which the sequence d(k) generated by training sequence generator 12 is filtered for forming a sample estimate sequence Y(k) in accordance with the formula:

$$Y(k) = \sum_{i=0}^{4} d(k-i)h(i)$$

This sample estimate sequence Y(k) represents the training sequence that would have been received in the receiver if the radio channel was exactly described by the channel estimate h(i).

In a calculating unit 20 the difference signal between the filtered signal Y(k) and the sampled received signal X(k) is formed, whereafter a measure of the energy of the difference signal is formed, for example in accordance with the formula:

$$E_n = \sum_{k=1}^{41} |Y(k) - X(k)|^2$$

This formula is appropriate for access bursts. In normal bursts the summation is instead between 5 and 26. The reason that the summation in this case starts at 5 is that previous Y(k)-values depend on X(k)-values that lie outside the received training sequence and therefore are unknown (see the formula above for Y(k)). In access bursts, however, the 8 first bits of the burst, which precede the training sequence, are also known (so called extended tail). Therefore the summation in access bursts can start at 1.

Finally, in a calculating unit 22 the quality measure SQ is formed in accordance with the formula:

$$SQ = \frac{K_1 E_s}{K_2 + E_n}$$

In this last formula $K_1$ is a constant for adjusting the dynamics in an integer number implementation. For the above mentioned access bursts $K_1$ can for instance have the value 32768, while a suitable value of $K_1$ for normal signal bursts is 8192.

$K_2$ is a constant that guarantees that SQ approaches zero when both $E_s$ and $E_n$ have small values. Therefore $K_2$ should preferably be greater than 0. A suitable value of $K_2$ is approximately 1000.

Above the present invention has primarily been described in connection with so called access bursts. However, it is appreciated that the method in accordance with the invention can also be suitable for forming a quality measure SQ for normal data bursts Furthermore, the method has been described in connection with the European GSM system. However, it is appreciated that the same principles can be used in other digital mobile radio communication systems, for instance the American system in accordance with the standard IS-54.

It will be understood by those skilled in the art that various modifications and changes may be made to the present invention without departure from the spirit and scope thereof, which is defined by the appended claims.

We claim:

1. A method in a digital mobile radio communication system for forming a quality measure signal SQ of a signal to noise ratio in a receiver for a sample signal vector of a received signal burst, said method comprising the steps of:

(a) sampling said received signal for forming said sample signal vector;

(b) determining a first estimate signal $E_n$ of the energy of a channel estimate from said sample signal vector, (c) determining a second estimate signal $E_n$ of the energy of a difference signal, said difference signal being the difference between a sample estimate sequence and said sample signal vector; and (d) determining a quality measure signal SQ for said sample signal vector in according with the formula:

$$SQ = \frac{K_1 E_s}{K_2 + E_n}$$

where $K_1$ and $K_2$ are predetermined constants.

2. The method in accordance with claim 1, wherein said first estimate signal $E_s$ is formed by calculating the total energy of the complex channel estimate of said signal burst, which has been calculated in said receiver.

3. The method in accordance with claim 2, wherein said channel estimate comprises a predetermined number of consecutive correlation values between a training sequence of the received signal burst and an exact training sequence generated internally in said receiver.

4. The method in accordance with claim 3, wherein said channel estimate comprises 5 correlation values.

5. The method in accordance with claim 3, wherein said second estimate signal $E_n$ is formed by calculating the energy of the difference signal vector between a vector formed by the training sequence of the received signal burst and a sample estimate vector formed by filtering the internally generated training sequence through a filter formed by said channel estimate.

6. The method in accordance with claim 1, wherein $K_2$ is greater than 0.

7. The method in accordance with claim 6, wherein $K_2$ is approximately 1000.

8. The method in accordance with claim 7, wherein $K_1=32768$.

9. The method in accordance with claim 7, wherein $K_1=8192$.

\* \* \* \* \*

UNITED STATES PATENT AND TRADEMARK OFFICE
CERTIFICATE OF CORRECTION

PATENT NO. : 5,657,348
DATED : August 12, 1997
INVENTOR(S) : Leif Linnus Ericsson, Andras Antal Toth, Johan Sköld It is certified that error appears in the above-indentified patent and that said Letters Patent is hereby corrected as shown below:

Column 3, Line 29

In claim 1, part of step (b) is corrected to read --determining a first estimate signal $E_s$-- instead of "determining a first estimated signal $E_n$".

Signed and Sealed this

Fourth Day of April, 2000

Attest:

Q. TODD DICKINSON

*Attesting Officer*  *Director of Patents and Trademarks*